United States Patent [19]

Iwata

[11] Patent Number: 4,582,034

[45] Date of Patent: Apr. 15, 1986

[54] IGNITION TIMING CONTROL DEVICE FOR INTERNAL COMBUSTION ENGINES

[75] Inventor: Toshio Iwata, Hyogo, Japan

[73] Assignee: Mitsubishi Denki Kabushiki Kaisha, Tokyo, Japan

[21] Appl. No.: 602,025

[22] Filed: Apr. 19, 1984

[30] Foreign Application Priority Data

Apr. 19, 1983 [JP] Japan .................................. 58-70455
May 16, 1983 [JP] Japan .................................. 58-86819

[51] Int. Cl.⁴ .............................................. F02B 5/04
[52] U.S. Cl. ................................... 123/425; 123/435
[58] Field of Search ..................... 123/425, 440, 435

[56] References Cited

U.S. PATENT DOCUMENTS

| | | | |
|---|---|---|---|
| 3,782,347 | 1/1974 | Schmidt | 123/440 |
| 4,370,963 | 2/1983 | Iwata | 123/425 |
| 4,370,964 | 2/1983 | Muranaka | 123/425 |
| 4,382,429 | 5/1983 | Enoshima | 123/425 |
| 4,385,607 | 5/1983 | Honiden | 123/425 |
| 4,417,556 | 11/1983 | Latsch | 123/425 |
| 4,425,891 | 1/1984 | Kashimura | 123/425 |
| 4,426,975 | 1/1984 | Suzuki | 123/425 |
| 4,440,129 | 4/1984 | Iwata | 123/425 |

FOREIGN PATENT DOCUMENTS

| | | | |
|---|---|---|---|
| 2832594 | 2/1979 | Fed. Rep. of Germany | 123/425 |
| 2946897 | 6/1980 | Fed. Rep. of Germany | 123/425 |
| 3103605 | 1/1982 | Fed. Rep. of Germany | 123/425 |

Primary Examiner—Ronald B. Cox
Attorney, Agent, or Firm—Sughrue, Mion, Zinn, Macpeak and Seas

[57] ABSTRACT

An ignition timing control device for an internal combustion engine including a knocking sensor for detecting knocking of the engine, a reference voltage generator for generating a reference voltage dependent on the level of an output signal from the knocking sensor, a comparator for comparing the output signal from the knocking sensor with the reference voltage and for generating a train of pulses dependent on an amplitude of knocking as produced, an integrator for integrating an output signal from the comparator in an analog or digital manner, ignition timing controller means responsive to the level of the output voltage from said integrator for controlling the ignition timing of the internal combustion engine, and control means triggerable by the output of said comparator for increasing a variation speed in the output signal level of said integrator during no knocking as time elapses, whereby a speed at which ignition timing of the internal combustion engine is advanced, is increased as time elapses.

9 Claims, 18 Drawing Figures

FIG. 1 PRIOR ART
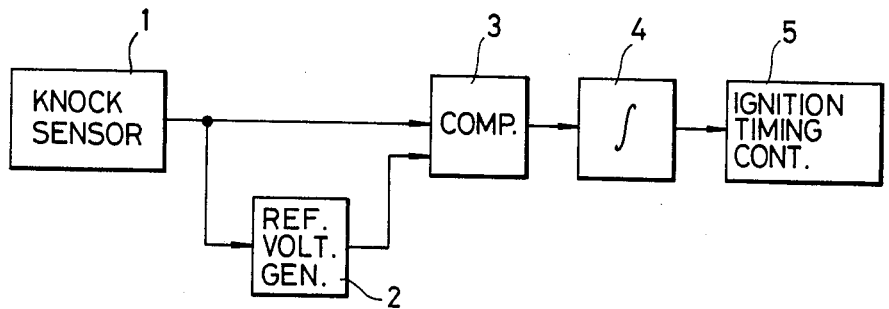
PRIOR ART
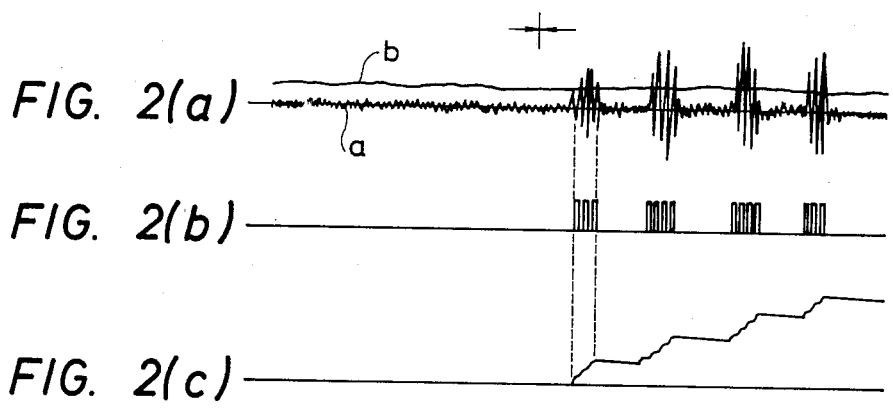
FIG. 2(a)
FIG. 2(b)
FIG. 2(c)
FIG. 3(a)
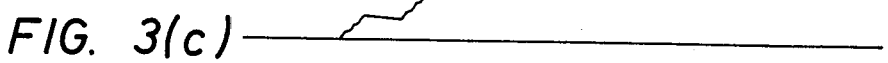
FIG. 3(c)

FIG. 6(a)
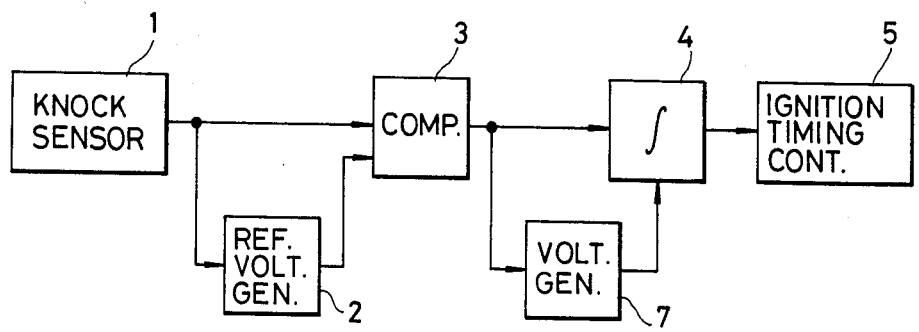
FIG. 7(a)
FIG. 7(b)
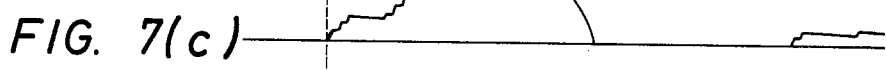
FIG. 7(c)
FIG. 7(d)

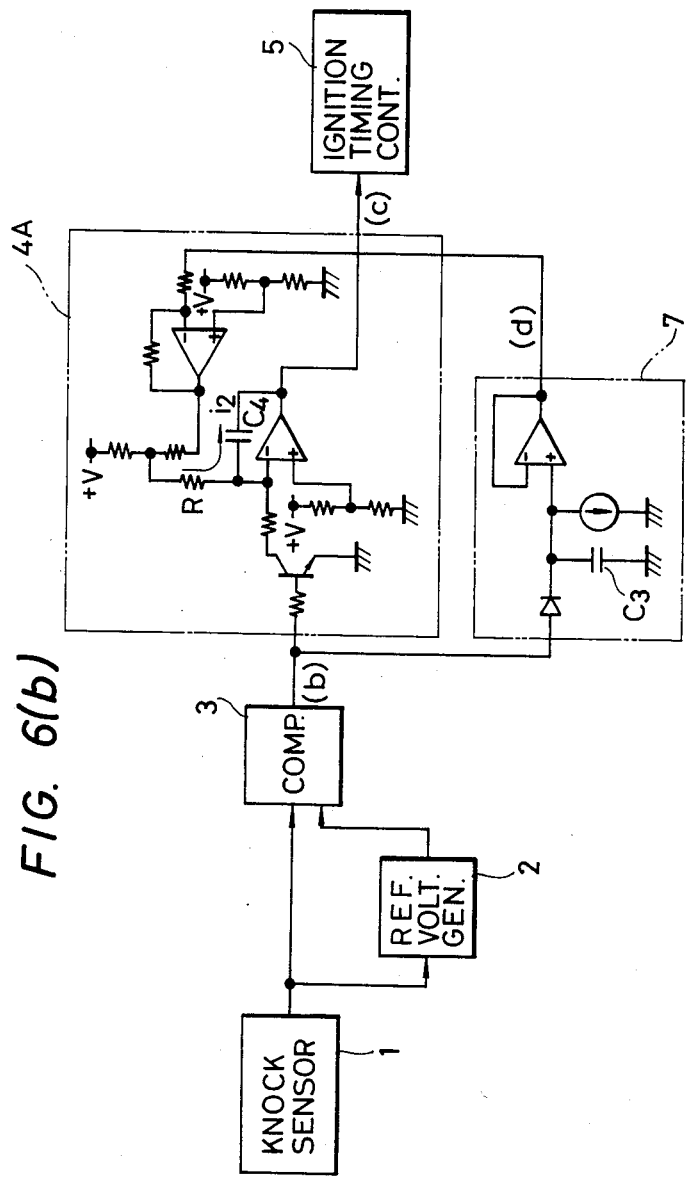

IGNITION TIMING CONTROL DEVICE FOR INTERNAL COMBUSTION ENGINES

BACKGROUND OF THE INVENTION

The present invention relates to an ignition timing control device for an internal combustion engine which controls the ignition timing of the engine in response to detected knocking of the engine.

Ignition timing control devices are known in which a knocking signal is produced in response to the vibration of the engine and variations in the pressure within an engine cylinder, a determination is made as to whether knocking has occurred on the basis of the knocking signal, and, if knocking has occurred, further knocking is prevented by retarding the ignition timing.

A conventional arrangement of such an ignition timing control device is illustrated in FIG. 1 of the accompanying drawings. The illustrated ignition timing control device includes a knocking sensor 1 for detecting knocking of an engine, a reference voltage generator 2 for generating a reference voltage dependent on the level of an output signal from the knocking sensor 1, and a comparator 3 for comparing the level of the output signal from the knocking sensor 1 with the reference voltage from the reference voltage generator 2.

The output signal from the comparator 3 is integrated by an integrator 4. In response to the output signal from the integrator 4, an ignition timing controller 5 determines the ignition timing according to parameters such as the speed of the engine and the engine load conditions.

FIGS. 2(a) to 2(c) illustrate the operation of the device shown in FIG. 1. As shown in FIG. 2(a), the output signal from the knocking sensor 1 has a vibratory waveform. When there is no knocking, the knocking sensor 1 produces a noise signal of a relatively low level as indicated by a. When knocking occurs, the knocking sensor 1 generates a signal of a larger amplitude in synchronization with the occurrences of knocking.

In response to the level of the noise signal produced by the knocking sensor 1, the reference voltage generator 2 generates as a reference voltage a DC voltage which is slightly higher in level than the noise signal, as indicated by b in FIG. 2(a).

The comparator 3 compares the output signal from the knocking sensor 1 with the reference voltage issued from the reference voltage generator 2. When no knocking is present as shown in FIG. 2(b), the output signal from the knocking sensor 1 contains noise components only and does not exceed the level of the reference voltage from the reference voltage generator 2. Therefore, the comparator 3 generates no output signal at all as shown in FIG. 2(b). When knocking occurs, the output signal from the knocking sensor 1 contains a large-amplitude component in addition to the noise signal, and hence exceeds the reference voltage level. Accordingly, the comparator 3 issues a train of pulses in response to the knocking dependent large-amplitude signal as shown in FIG. 2(b).

This integrator 4 integrates the pulse train and produces an increasing output voltage as shown in FIG. 2(c). The ignition timing controller 5 retards the ignition timing to prevent engine knocking from being produced in an amount dependent on the output voltage level from the integrator 4. When the knocking stops, the output voltage level of the integrator 4 drops at a prescribed rate to advance the ignition timing to an original angle.

It has been the general practice in such an ignition timing control system to increase the speed of retarding the ignition timing in order to raise the control response rate at the time of knocking, and also to lower the speed of advancing ignition timing to the original angle in order to provide better stability for controlling at knocking limits. In providing such settings, however, suitable control operation is unable to be obtained, particularly, if the engine speed or load conditions change in a short period of time at the time of acceleration. FIG. 3 illustrates one such varying knocking generating condition.

FIG. 3(a) shows the waveform of an output signal from the knocking sensor 1, the waveform being indicative of a knocking generating condition. FIG. 3(c) illustrates an output voltage generated by the integrator 4 when knocking occurs as shown in FIG. 3(a), the output voltage being representative of the manner in which the ignition timing is retarded.

During an initial knocking interval (A) indicated in FIG. 3(a), the ignition timing is retarded with a good response to suppress knocking immediately. However, since the output voltage from the integrator 4 drops at a relatively low rate in a knocking-free interval (B) in FIG. 3(a), the ignition timing remains retarded unnecessarily even after knocking has already been eliminated. This leads to a problem in that the acceleration response of the engine is deteriorated.

SUMMARY OF THE INVENTION

With the prior drawbacks in view, it is an object of the present invention to provide an ignition timing control device having means for increasing the speed of advancing the ignition timing when there is no knocking and dependent on the time that has elapsed, thereby to advance the ignition timing quickly, so that unnecessary ignition timing retards are prevented, avoiding a reduction in the engine output power after knocking has been eliminated.

According to the present invention, there is provided an ignition timing control device for an internal combustion engine, comprising a knocking sensor for detecting knocking of the engine, a reference voltage generator for generating a reference voltage dependent on the level of an output signal from the knocking sensor, a comparator for comparing the output signal from the knocking sensor with reference voltage and for generating a train of pulses dependent on the amplitude of the knocking, an integrator for integrating an output signal from the comparator in an analog or digital manner, ignition timing controller means responsive to the level of the output voltage from said integrator for controlling the ignition timing of the internal combustion engine, and control means triggerable by the output of said comparator for increasing a variation speed in the output signal level of said integrator during no knocking as time elapses, whereby a speed at which ignition timing of the internal combustion engine is advanced, is increased as time elapses.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a block diagram of a conventional ignition timing control device;

FIGS. 2(a) through 2(c) are diagrams indicating the operation of the ignition timing control device of FIG. 1;

FIGS. 3(a) and 3(c) are diagrams showing operations of the ignition timing control device of FIG. 1 at the time of acceleration;

FIG. 6(a) is a block diagram of an ignition timing control device according to another embodiment of the present invention;

FIG. 6(b) is a detailed schematic diagram of the circuit of FIG. 6(a); and

FIGS. 7(a) through 7(d) are diagrams illustrative of operation of the ignition timing control device of FIGS. 6(a) and 6(b) at the time of acceleration.

DESCRIPTION OF THE PREFERRED EMBODIMENTS

Figure 4A:
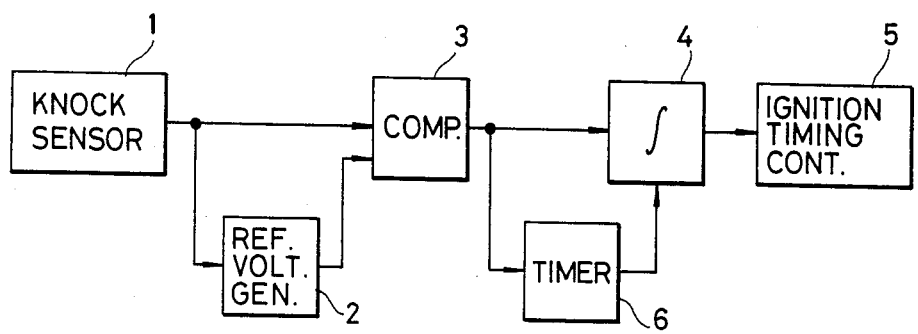
FIG. 4(a) is a block diagram of an ignition timing control device according to an embodiment of the present invention.

FIG. 4(a) shows an ignition timing control device according to a preferred embodiment of the present invention. Like or corresponding parts in FIG. 4(a) are denoted by like or corresponding reference numerals in FIG. 1, and will not be described in detail.

The ignition timing control device shown in FIG. 4(a) includes a timer 6 in addition to the circuit arrangement illustrated in FIG. 1. The timer 6 has a trigger input terminal connected to an output terminal of the comparator 3 and an output terminal to the integrator 4 for changing the speed at which the output voltage thereof drops (corresponding to the speed of advancing the ignition timing).

The timer 6, triggered by an output pulse from the comparator 3, maintains a high output level for a preset interval of time T. When another pulse is issued from the comparator 3 while the output from the timer 6 remains high, the timer 6 is triggered again.

When the output level of the timer 6 is high, the speed at which the output voltage from the integrator 4 drops is relatively slow, and when the output level of the timer is low, the voltage dropping speed in the integrator 4 is switched to a relatively fast mode.

Figure 5A:
FIGS. 5(a) through 5(d) are diagrams illustrative of operation of the ignition timing control device of FIGS. 4(a) and 4(b) at the time of acceleration.
Figure 5B:
Figure 5C:
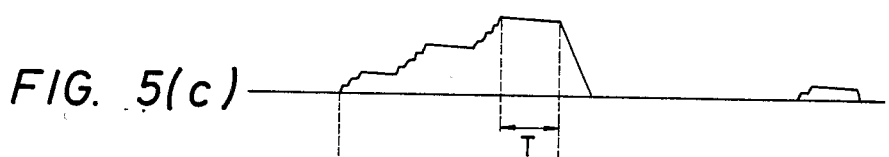
Figure 5D:
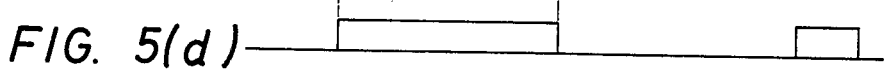

Operation of the ignition timing control device thus constructed will be described with reference to FIGS. 5(a) through 5(d). FIGS. 5(a) through 5(c) correspond respectively to FIGS. 2(a) through 2(c). FIG. 5(d) is illustrative of the waveform of an output signal from the timer 6.

The engine is in an acceleration mode in the same manner as shown in FIGS. 3(a) and 3(c). During an initial knocking interval (A), the output voltage from the integrator 4 rises with a good response, as shown in FIG. 5(c), through knocking detection, thereby suppressing knocking generation. At the time when knocking ceases and from such time on (during a knocking-free interval (B)), the output voltage from the integrator 4 starts dropping.

During the initial knocking interval (A), the comparator 3 continues to generate pulses, the timer 6 is triggered by the pulses and maintains its high output level for the time interval T. If initial knocking occurs at intervals shorter than the time T to which the timer 6 has been set, the output level of the timer 6 remains continuously high in the initial knocking interval (A) as shown in FIG. 5(d).

In the initial knocking interval (A), therefore, the output voltage from the integrator 4 is in the relatively slow mode, allowing the ignition timing to be advanced at a slow rate in no-knocking periods. Upon elapse of the preset time interval T after knocking has been eliminated, the output from the timer 6 goes low, and the speed at which the output voltage from the integrator 4 drops is switched to the relatively fast mode, in which ignition timing is advanced at a higher speed.

Figure 4B:
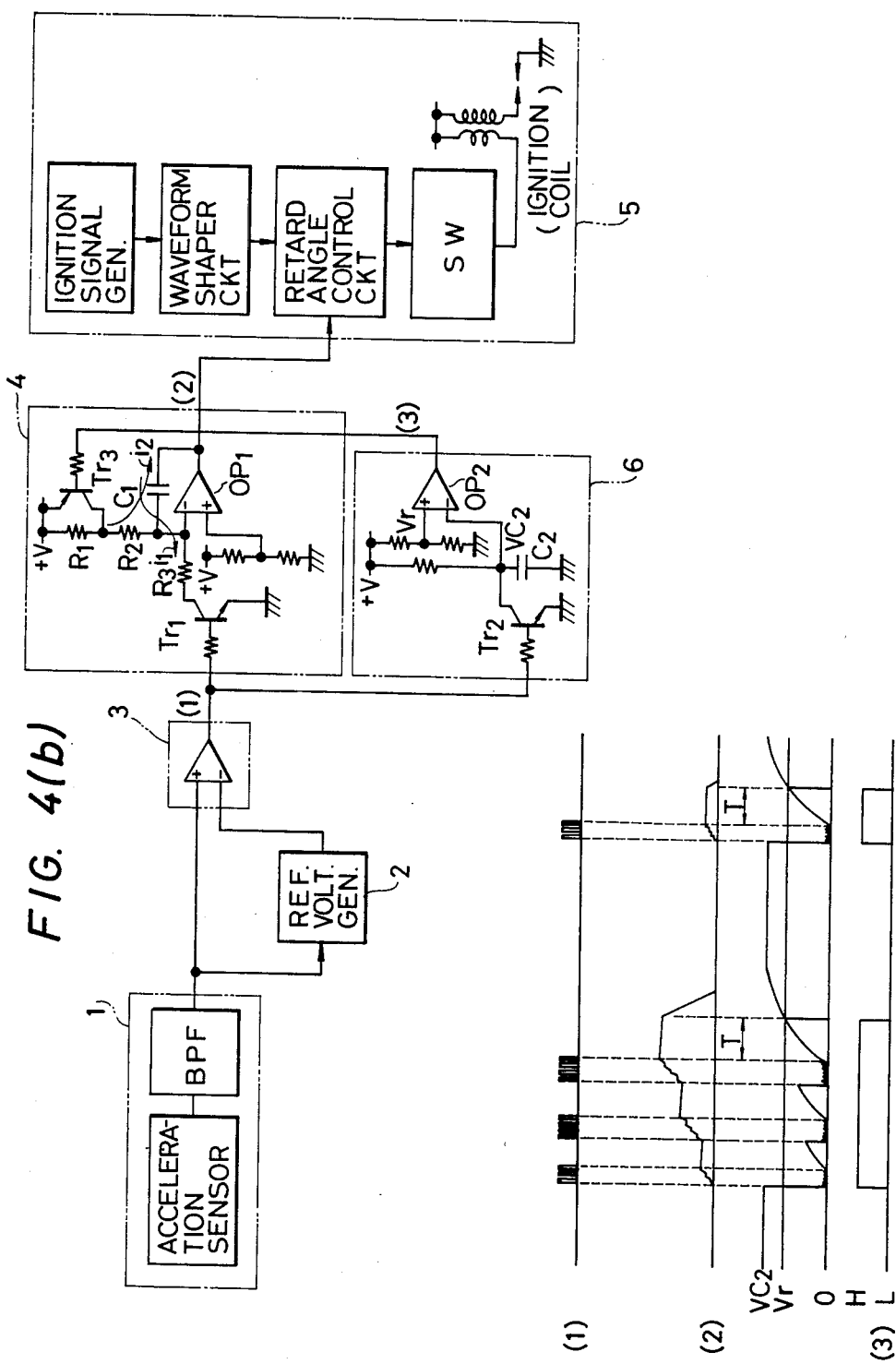
FIG. 4(b) is a detailed schematic diagram of the circuit of FIG. 4(a), and (1)–(3) are diagrams illustrating operation of the circuit of FIG. 4(b) at the points marked therein.

FIG. 4(b) is a detailed diagram of the circuit shown in FIG. 4(a).

When knocking occurs, a knocking signal as shown in waveform (a) in FIG. 4(b) is generated by the comparator 3. When the knocking signal is high, a transistor $Tr_1$ in the integrator 4 is rendered conductive so that a capacitor $C_1$ is charged by a current $i_1$ flowing through a resistor $R_3$. As a result, the output voltage of an operational amplifier $OP_1$ increases. On the other hand, when the knocking level is low, the transistor $Tr_1$ is rendered nonconductive so that the capacitor $C_1$ is inversely charged by a current $i_2$ flowing through resistors $R_1$ and $R_2$. As a result, the output voltage of the operational amplifier $OP_1$ decreases.

Upon the occurrence of the knocking signal, as shown at (1), a transistor $Tr_2$ in the timer 6 is rendered conductive to thereby discharge a capacitor $C_2$ immediately. As a result, an input signal $VC_2$ to an inverting input terminal of an operational amplifier $OP_2$ is made lower than a reference voltage Vr, and thus the output of the timer is changed to high. If no knocking signal is present, as shown at (2) $VC_2$ exceeds the reference voltage Vr and thus the output level of the timer 6 becomes lower. When the output level is high, as shown at (3) a transistor $Tr_3$ connected in parallel with the resistor $R_1$ of the integrator 4 is rendered nonconductive. Accordingly, due to a small current flowing through resistors $R_1$ and $R_2$, the output of the operational amplifier $OP_1$ is reduced gradually. In this case, however, when the output of the timer 6 becomes low, the transistor $Tr_3$ is rendered conductive to thereby short-circuit the resistor $R_1$. Consequently, the current $i_2$ increases rapidly, and therefore the output of the operational amplifier $OP_1$ also decreases rapidly.

In the foregoing embodiment, the advancement of the ignition timing is continuously varied. However, the ignition timing may be advanced stepwise by varying the output voltage from the integrator 4 in increments or by using a counter in place of the integrator 4. The present invention is applicable to such an arrangement by changing the extent to which ignition timing is advanced or the interval in which ignition timing is advanced.

While in the above-described embodiment the speed of ignition timing advance is changed upon elapse of the time interval T preset by the timer 6 after knocking has been eliminated, the timer 6 may be replaced with a counter, as described above, for counting ignition signals, and changing ignition timing advancing speeds a predetermined number of ignition pulse periods after knocking has ceased.

Although the ignition timing advancing speed has been described as being switched to a faster mode, it may be switched to a mode of operation in which the ignition timing advancing speed is increased to an infinite level, that is, to a mode of operation in which the ignition timing is advanced in a single very fast step.

FIGS. 6(a), 6(b) and 7 illustrate an ignition timing control device according to another embodiment of the present invention. Like or corresponding parts in FIG. 6 are designated by like or corresponding reference numerals in FIG. 1. A voltage generator 7 has a trigger input terminal for setting a generated voltage to a predetermined voltage level. The trigger input terminal of the voltage generator 7 is connected to the output terminal of the comparator 3. The voltage generator 7 has an output terminal coupled to the integrator 4 for controlling the speed at which the output voltage of the integrator 4 drops (ignition timing advancing speed). The voltage generator 7 is triggered by an output pulse from the comparator 3 to set the generated voltage to the predetermined voltage level. Thereafter, the generated voltage drops at a prescribed rate. When a pulse is issued from the comparator 3 while the voltage generated by the voltage generator 7 is falling, the voltage generator 7 is triggered again. When the voltage generated by the voltage generator 7 reaches a high level, the speed at which the output voltage from the integrator 4 drops is relatively low. As the voltage generated by the voltage generator 7 becomes progressively lower in level, the speed at which the output voltage from the integrator 4 drops becomes higher. Stated otherwise, the voltage generated by the voltage generator 7 controls the speed at which the output voltage from the integrator 4 drops.

FIGS. 7(a) through 7(d) illustrate the waveforms of signals generated in the ignition timing control device of FIG. 6. More specifically, FIG. 7(a) shows an output from the knocking sensor 1, FIG. 7(b) shows an output from the comparator 3, FIG. 7(c) shows an output from the integrator 4, and FIG. 7(d) shows an output from the voltage generator 7. The engine is here in an acceleration mode in the same manner as shown in FIGS. 3(a) and 3(c). During an initial knocking interval (A), the output voltage from the integrator 4 rises with good response upon knocking detection, thereby suppressing knocking generation. At the time when knocking ceases and from such time on (during a knocking-free interval (B)), the output voltage from the integrator 4 starts dropping.

During the initial knocking interval (A), the comparator 3 continues to generate pulses, and the voltage generator 7 is triggered by the pulses and sets the generated voltage to the prescribed level. If initial knocking occurs at relatively short intervals, then the voltage generated by the voltage generator 7 keeps on being set in the initial knocking interval (A) as shown in FIG. 7(d) so that the high-level voltage is continuously issued from the voltage generator 7.

In the initial knocking interval (A), therefore, the speed at which the output voltage from the integrator 4 drops is relatively low, allowing the ignition timing to be advanced at a slow rate in no-knocking periods. After knocking has been eliminated, the voltage generated by the voltage generator 7 is gradually lowered, while the speed at which the output voltage from the integrator 4 drops becomes progressively higher, with the result that ignition timing is advanced at a higher speed.

In the conventional ignition timing control device shown in FIG. 1, the ignition timing remains retarded unnecessarily since the rate of advancement of the ignition timing is relatively slow after knocking has been eliminated, as shown in FIG. 3(c). According to the embodiment of FIG. 6(a), however, ignition timing is rapidly advanced after knocking has ceased, thus eliminating any unnecessary ignition timing retard. Therefore, an unwanted reduction in the engine output power is prevented. In a steady mode of operation, for controlling the engine to knocking limits, knocking occurrence intervals are relatively short, and hence the voltage generator 6 is triggered again to maintain a high-level voltage. As a result, the speed at which the output voltage from the integrator 4 drops is relatively low, and hence the control stability is not impaired.

In the foregoing embodiment, the advancement of the ignition timing is varied continuously. However, the ignition timing may be advanced stepwise, and the present invention is applicable to such an arrangement by controlling the angle through which the ignition timing is advanced at each step with the voltage generated by the voltage generator 7.

FIG. 6(b) is a detailed diagram of the circuit shown in FIG. 6(a).

Upon the occurrence of the knocking signal, a capacitor $C_3$ of the voltage generator 7 is rapidly charged to a predetermined level by the knocking signal, and then the capacitor $C_3$ is gradually discharged by a constant current discharge circuit. The output of the voltage generator 7 is inverted by an inverting amplifier in the integrator 4A. A charging current $i_2$ of a capacitor $C_4$ flowing through a resistor R is changed in accordance with the voltage level of the inverting amplifier so that the rate of decrease of the output of the integrator 4A increases with time.

With the present invention, as described above, the speed at which ignition timing is advanced or the angle through which the ignition timing is advanced in knocking-free intervals is increased dependent over time. When the engine operation enters an operation zone free of knocking during an engine transient condition, the speed at which the ignition timing is advanced can be increased so that unnecessary ignition timing retards can be eliminated and engine power reduction is avoided.

Although certain preferred embodiments have been shown and described, it should be understood that many changes and modifications may be made thereto without departing from the scope of the appended claims.

I claim:

1. An ignition timing control device for an internal combustion engine, comprising:
    (a) a knocking sensor for detecting knocking of the engine;
    (b) a reference voltage generator for generating a reference voltage dependent on the level of an output signal from said knocking sensor;
    (c) a comparator for comparing said output signal from said knocking sensor with said reference voltage to generate a train of pulses in a number dependent on an amplitude of knocking;
    (d) an integrator for integrating an output signal from said comparator;

(e) ignition timing controller means responsive to the level of the output voltage from said integrator for controlling the ignition timing of the internal combustion engine, said ignition timing controller means retarding said ignition timing at a fixed rate when knocking is detected, and advancing said ignition timing at a speed that is variable with an elapsed time during which no knocking is detected; and (f) control means triggerable by the output of said comparator for increasing a variation speed in the output signal level of said integrator during no knocking as time elapses, whereby said speed at which ignition timing of the internal combustion engine is advanced, is increased as time elapses.

2. The ignition timing control device of claim 1, wherein said control means comprises switching means for switching the rate at which an output voltage from said integrator drops from a slower mode to a faster mode upon elapse of a predetermined interval of time.

3. The ignition timing control device of claim 2, wherein said switching means comprises a timer coupled to said integrator for controlling an integrating time constant of said integrator.

4. The ignition timing control device of claim 1, wherein said control means comprises means for varying the variation speed in the output signal level of said integrator successively.

5. The ignition timing control device of claim 4, wherein said control means comprises means for generating a control signal whose signal level varies successively in proportion to the lapse of time, to increase the variation speed in the output signal level of said integrator successively.

6. The ignition timing control device of claim 1, wherein said integrator comprises an analog integrator.

7. The ignition timing control device of claim 1, wherein said integrator comprises a digital integrator.

8. An ignition timing control device for an internal combustion engine, comprising:

(a) a knocking sensor for detecting knocking of the engine;

(b) a reference voltage generator for generating a reference voltage dependent on the level of an output signal from said knocking sensor;

(c) a comparator for comparing said output signal from said knocking sensor with said reference voltage to generate a train of pulses in a number dependent on an amplitude of knocking;

(d) an integrator for integrating an output signal from said comparator, said integrator having selectable first and second integrating time constants, said first time constant being greater than said second time constant;

(c) timer means triggerable by the output signal from said comparator, an output of said timer being coupled to said integrator for selecting between said first and second integrating time constants, said first time constant being selected when said timer means is performing a timing operation upon being triggered by said output signal from said comparator and said second time constant being selected after said timer means has completed said timing operation; and (f) ignition timing controller means responsive to an output from said integrator for controlling the ignition timing of the internal combustion engine, said ignition timing controller means retarding said ignition timing at a fixed rate when knocking is detected, and advancing said ignition timing at a speed that is variable with an elapsed time during which no knocking is detected.

9. An ignition timing control device for an internal combustion engine, comprising:

(a) a knocking sensor for detecting knocking of the engine;

(b) a reference voltage generator for generating a reference voltage dependent on the level of an output signal from said knocking sensor;

(c) a comparator for comparing said output signal from said knocking sensor with said reference voltage to generate a train of pulses in a number dependent on an amplitude of knocking;

(d) an integrator for integrating an output signal from said comparator; said integrator having a selectable integrating source voltage;

(c) voltage signal generating means triggerable by the output signal from said comparator, for producing a voltage signal varying monotonically between first and second levels in response to said pulses, said voltage signal being applied to said integrator to select said integrating source voltage such that said integrating source voltage is increased when there is no knocking within a predetermined interval of time; and (f) ignition timing controller means responsive to an output from said integrator for controlling the ignition timing of the internal combustion engine, said ignition timing controller means retarding said ignition timing at a fixed rate when knocking is detected, and advancing said ignition timing at a speed that is variable with an elapsed time during which no knocking is detected.

* * * * *